United States Patent
Jiang et al.

(10) Patent No.: US 12,247,653 B2
(45) Date of Patent: Mar. 11, 2025

(54) TRANSMISSION GEAR BOX

(71) Applicant: GUANGDONG ZHAOQING L&V CO. LTD., Guangdong (CN)

(72) Inventors: Yuan Jiang, Guangdong (CN); Huoming Li, Guangdong (CN); Xianghuai Qiu, Guangdong (CN)

(73) Assignee: GUANGDONG ZHAOQING L&V CO. LTD., Guangdong (CN)

( * ) Notice: Subject to any disclaimer, the term of this patent is extended or adjusted under 35 U.S.C. 154(b) by 0 days.

(21) Appl. No.: 17/905,044

(22) PCT Filed: Feb. 20, 2021

(86) PCT No.: PCT/CN2021/077030
§ 371 (c)(1),
(2) Date: Aug. 25, 2022

(87) PCT Pub. No.: WO2021/169865
PCT Pub. Date: Sep. 2, 2021

(65) Prior Publication Data
US 2023/0133002 A1    May 4, 2023

(30) Foreign Application Priority Data
Feb. 26, 2020 (CN) .......................... 202010119253.6

(51) Int. Cl.
*F16H 57/02* (2012.01)
*B23K 26/20* (2014.01)
(Continued)

(52) U.S. Cl.
CPC ......... *F16H 57/031* (2013.01); *B23K 33/006* (2013.01); *B23K 26/28* (2013.01);
(Continued)

(58) Field of Classification Search
CPC .................. F16H 57/03; F16H 57/031; F16H 2057/02008; F16H 2057/02017;
(Continued)

(56) References Cited

U.S. PATENT DOCUMENTS 2,932,992 A    4/1960    Larsh
4,043,021 A    8/1977    Mosbacher et al.
(Continued)

FOREIGN PATENT DOCUMENTS

CN    2646326 Y    10/2004
CN    201190767 Y    2/2009
(Continued)

OTHER PUBLICATIONS

English translation of International Search Report and Written Opinion for Application No. PCT/CN2021/077030, dated May 11, 2021 (8 pages).
(Continued)

*Primary Examiner* — Adam D Rogers
(74) *Attorney, Agent, or Firm* — Michael Best & Friedrich LLP

(57) ABSTRACT

A transmission gear box includes a cylindrical box body defining a cavity for gears and an end cover fixed on at least one axially opened end of the cavity of the box body. A fitting structure includes an inner fitting surface located on a surface of one of the box body and the end cover and an outer fitting surface located on a surface of the other one of the box body and the end cover. The inner fitting surface and the outer fitting surface are fixed to each other. A clearance fit area with interference fit areas located on both sides thereof is arranged between the inner fitting surface and the outer fitting surface such that during welding of the inner
(Continued)

fitting surface to the outer fitting surface, a molten body produced by melting of the interference fit areas flows to the clearance fit area.

7 Claims, 5 Drawing Sheets

(51) Int. Cl.
| | | |
|---|---|---|
| B23K 33/00 | (2006.01) | |
| B23K 37/06 | (2006.01) | |
| F16H 57/031 | (2012.01) | |
| B23K 26/28 | (2014.01) | |

(52) U.S. Cl.
CPC .... *B23K 37/06* (2013.01); *F16H 2057/02008* (2013.01); *F16H 2057/02017* (2013.01)

(58) Field of Classification Search
CPC .... B23K 26/244; B23K 26/28; B23K 33/006; B23K 37/06
See application file for complete search history.

(56) References Cited

U.S. PATENT DOCUMENTS

| | | | |
|---|---|---|---|
| 5,144,849 A | 9/1992 | Aihara et al. | |
| 5,429,558 A | 7/1995 | Lagarde | |
| 7,083,538 B2 | 8/2006 | Szalony | |
| 7,329,203 B2 | 2/2008 | Radinger et al. | |
| 8,262,164 B2 | 9/2012 | Ito et al. | |
| 8,376,901 B2* | 2/2013 | Riester | F16H 1/46 475/331 |
| 8,814,742 B2* | 8/2014 | Uchida | B23K 33/006 475/901 |
| 8,876,649 B2* | 11/2014 | Uchida | F16D 1/0858 475/248 |
| 9,309,921 B2 | 4/2016 | Kanai | |
| 9,776,483 B2 | 10/2017 | Shchokin et al. | |
| 9,783,027 B1 | 10/2017 | Elie et al. | |
| 9,816,587 B2 | 11/2017 | Koike et al. | |
| 10,125,855 B2* | 11/2018 | Yanase | F16H 48/40 |
| 10,344,857 B2 | 7/2019 | Wang | |
| 10,352,432 B2* | 7/2019 | Richter | B29C 65/0672 |
| 10,376,993 B2* | 8/2019 | Davis | B23K 20/12 |
| 10,704,651 B2* | 7/2020 | Tsai | F16H 57/031 |
| 11,054,015 B2* | 7/2021 | Antes | B23K 26/28 |
| 2002/0195291 A1* | 12/2002 | Nonogaki | F16D 3/387 180/337 |
| 2004/0200569 A1* | 10/2004 | Weiblen | B29C 66/1282 156/272.8 |
| 2013/0195545 A1* | 8/2013 | Tsuchida | B23K 31/003 403/270 |
| 2013/0255438 A1* | 10/2013 | Kieninger | B29C 65/1635 219/121.64 |
| 2013/0269305 A1 | 10/2013 | Wang et al. | |
| 2015/0024898 A1 | 1/2015 | Radzevich | |
| 2015/0059250 A1 | 3/2015 | Miu et al. | |
| 2015/0283924 A1 | 10/2015 | Naoufel et al. | |
| 2016/0312514 A1 | 10/2016 | Leonard | |
| 2021/0116019 A1 | 4/2021 | Port | |
| 2021/0140516 A1 | 5/2021 | Gong et al. | |

FOREIGN PATENT DOCUMENTS

| | | | | |
|---|---|---|---|---|
| CN | 101680523 A | 3/2010 | | |
| CN | 101844527 A | 9/2010 | | |
| CN | 101861442 A | 10/2010 | | |
| CN | 101868590 A | 10/2010 | | |
| CN | 102039835 A | 5/2011 | | |
| CN | 102310789 A | 1/2012 | | |
| CN | 102350514 A | 2/2012 | | |
| CN | 102470486 A | 5/2012 | | |
| CN | 102652047 A | 8/2012 | | |
| CN | 102791518 A | 11/2012 | | |
| CN | 202863201 U | 4/2013 | | |
| CN | 103119333 A | 5/2013 | | |
| CN | 103363066 A | 10/2013 | | |
| CN | 103429377 A | 12/2013 | | |
| CN | 103732348 A | 4/2014 | | |
| CN | 104121337 A | 10/2014 | | |
| CN | 204327938 U | 5/2015 | | |
| CN | 205400342 U | 7/2016 | | |
| CN | 205780789 U | 12/2016 | | |
| CN | 206060455 U | 3/2017 | | |
| CN | 206072252 U | 4/2017 | | |
| CN | 206145116 U | 5/2017 | | |
| CN | 206626165 U | 11/2017 | | |
| CN | 107830121 A | 3/2018 | | |
| CN | 108458090 A | 8/2018 | | |
| CN | 108591385 A | 9/2018 | | |
| CN | 208221488 U | 12/2018 | | |
| CN | 110030368 A | 7/2019 | | |
| CN | 110486424 A | 11/2019 | | |
| CN | 111207200 A | 5/2020 | | |
| CN | 211649001 U | 10/2020 | | |
| CN | 112747066 A | * | 5/2021 | .......... B23K 33/006 |
| DE | 3418686 | | 10/1985 | |
| DE | 10015769 A1 | | 5/2001 | |
| DE | 102006049808 B4 | | 2/2012 | |
| DE | 102014214382 B3 | | 11/2015 | |
| DE | 102015216676 A1 | | 3/2017 | |
| DE | 102016223667 A1 | | 5/2018 | |
| JP | H02154835 A | | 6/1990 | |
| JP | 2000080872 A | | 3/2000 | |
| JP | 2001173733 A | * | 6/2001 | .............. F16H 1/46 |
| KR | 101221269 B1 | | 1/2013 | |
| KR | 20180125361 A | | 11/2018 | |
| WO | 2016006141 A1 | | 1/2016 | |

OTHER PUBLICATIONS

International Search Report and Written Opinion for Application No. PCT/CN2020/113242 dated Nov. 12, 2020, with translation (14 pages).
International Search Report with Written Opinion for related Application No. PCT/CN2017/076920 dated Jun. 12, 2017 (14 Pages Including English Translation).
International Search Report and Written Opinion for Application No. PCT/CN2017/092460 dated Oct. 16, 2017 (14 pages including English translation).
International Search Report with Written Opinion for related Application No. PCT/CN2018/118175 dated Feb. 25, 2019 (13 Pages).
International Search Report with Written Opinion for related Application No. PCT/CN2019/083796 dated Jun. 28, 2019 (11 Pages including English Translation).

* cited by examiner

TRANSMISSION GEAR BOX

TECHNICAL FIELD

The present invention relates to a reduction gearbox, more particularly to a reduction gearbox with a planetary gear mechanism. The reduction gearbox comprises a box body and an end cover which are fixedly connected by welding.

BACKGROUND ART

A transmission gear box, especially a transmission gear with a planetary gear mechanism, usually comprises a cylindrical box body. The interior of the box body defines a cavity for arranging gears. The open end of the cavity is fixedly provided with an end cover, which provides limit and support for the gears inside the box body.

In order to fix the end cover to the box body, the prior art provides the following solution: connecting flanges are arranged on the box body and the end cover respectively, and fixing bolts are used to connect the two flanges, so as to form a flange connection between the end cover and the box body. The flange connection in this solution has a complex structure, which leads to complicated manufacturing and assembly processes of the gear box, and it is difficult to obtain a good concentricity between the box body and the end cover.

In another solution of the prior art, the box body and end cover are configured as interference fit on the axial surface, and the box body and end cover are fixedly connected to each other by laser welding at the fitting structure. Due to the large interference fit area between the box body and the end cover, the components must have a high manufacturing accuracy, and the cooperative area can be easily deformed during the welding process.

SUMMARY OF THE INVENTION

The present invention provides a novel transmission gear box, which has a novel fitting structure, so that the box body and end cover have as little failure deformation as possible during the welding process.

To this end, the transmission gear box according to the present invention comprises a box body, at least one end cover, and a fitting structure, wherein the box body is cylindrical and defines a cavity suitable for arranging gears; the at least one end cover is fixed on at least one opening end, which is axially opened, of the cavity of the box body, and the fitting structure extends at least in an axial direction of the box body and the end cover, the fitting structure comprising an inner fitting surface provided on the surface of the cavity of one of the box body and the end cover, and an outer fitting surface provided on the peripheral surface of the other one of the box body and the end cover, wherein the inner fitting surface and the outer fitting surface are fixed to each other by means of welding; at least one clearance fit area and interference fit areas located on both sides of the clearance fit area are configured between the inner fitting surface and the outer fitting surface, so that a molten body produced by melting of the interference fit areas during welding flows to the clearance fit area under pressure.

During welding, the interference fit area where the outer rib and the inner rib are located melts locally under high temperature, and flows into the clearance fit area between the outer rib and the inner rib under pressure. It can be seen that in this solution, by setting a corresponding clearance fit area near the interference fit area, the product deformation caused by the extrusion of the molten body against the box body and end cover during the welding process can be effectively avoided. In contrast, in the solution of the prior art, the interference fit area will expand due to temperature rise and melting during the welding, resulting in large deformation of the fitting structure and even the entire box body and end cover, or even worse, waste products may be produced.

Advantageously, the outer fitting surface is provided with an outer rib extending along the circumferential direction, and the inner fitting surface is provided with an inner rib extending along the circumferential direction, wherein the outer rib and the inner rib are staggered with each other and form the interference fit area with the opposite mating surfaces, and an area between the outer rib and the inner rib forms the clearance fit area.

Advantageously, the outer fitting surface is provided with a plurality of axially extending outer ribs, each of the outer ribs and the opposite inner fitting surface form the interference fit area, and a part between two adjacent outer ribs and the opposite inner fitting surface form the clearance fit area.

Advantageously, the plurality of outer ribs are parallel to each other and uniformly distributed on the entire circumference of the outer fitting surface.

Advantageously, the fitting structure comprises an inner fitting surface arranged on the axial inner peripheral surface of the cavity of the box body and an outer fitting surface arranged on the axial outer peripheral surface of the end cover.

Advantageously, the box body comprises a left open end and a right open end which are opened in opposite directions from the cavity in the axial direction, and the at least one end cover comprises a left end cover and a right end cover which are respectively fixed to the left open end and the right open end.

Advantageously, identical fitting structures are provided between the left end cover and the box body and between the right end cover and the box body.

Advantageously, the surface of the cavity of the box body is provided with a tooth groove, so that the box body and the gear contained in the cavity thereof together form a planetary gear mechanism.

Advantageously, the outer fitting surface is provided with at least two outer ribs extending along the circumferential direction, each outer rib and the opposite inner fitting surface form the interface fit area, and the area between two adjacent outer ribs and the opposite inner fitting surface form the clearance fit area.

DETAILED DESCRIPTION OF THE EMBODIMENTS

Figure 1:
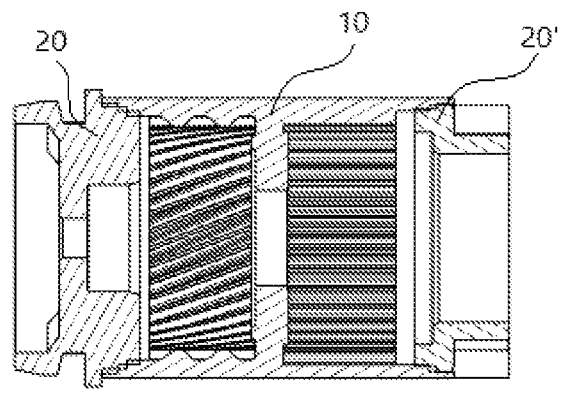
FIG. 1 is an axial section diagram of a transmission gear box with a planetary gear mechanism according to one embodiment of the present invention, in which the gears are omitted to show the contents of the invention more clearly and concisely.

FIGS. 1-5 show a transmission gear box with a planetary gear mechanism according to one embodiment of the present invention. Referring to FIG. 1, the transmission gear box comprises a box body 10 and a left end cover 20 and a right end cover 20' at both ends thereof. The box body 10 is generally cylindrical, and its cavity is suitable for arranging a plurality of gears according to a predetermined structure. The components like gears and related rotating shafts are omitted in the figure for simplicity and clarity. The left end cover 20 and the right end cover 20' are suitable for matching with the gears arranged in the box body to position and support the gears.

Figure 2:
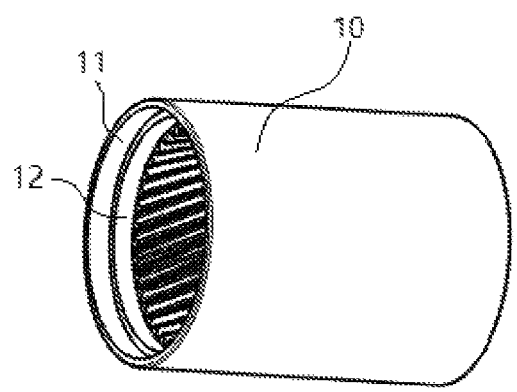
FIG. 2 is a schematic diagram of the box body in FIG. 1.

It can be seen from FIG. 1 and FIG. 2 that the cavity surface of the box body is provided with a tooth groove, so the box body can be used as a ring gear to cooperate with the gear to form a planetary gear mechanism. However, the technical solution of the present invention is not only applicable to the transmission gear box with a planetary gear mechanism, but also applicable to other types of transmission gear boxes. Therefore, when the gear box according to the present invention is not used for a planetary gear mechanism, it is not necessary to set a tooth groove on the cavity surface of the box body.

Figure 3:
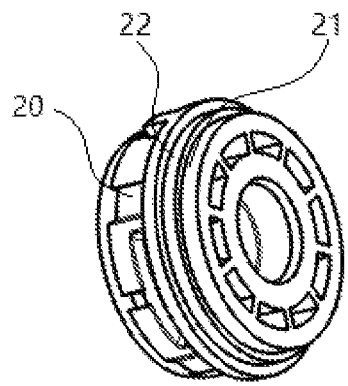
FIG. 3 is a schematic diagram of the left end cover in FIG. 1.
Figure 4:
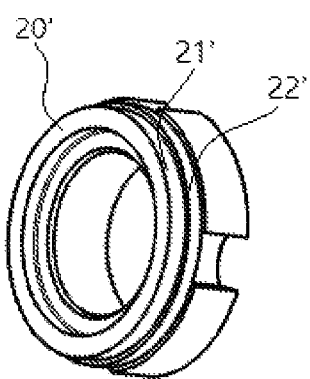
FIG. 4 is a schematic diagram of the right end cover in FIG. 1.

Referring to FIG. 3 and FIG. 4, the left end cover 20 and the right end cover 20' arranged at the left and right open ends of the box body 10 in an orientation as shown in FIG. 1 are different, so as to mate with different gears and undertake different support functions. It can be understood that, as an alternative to the current embodiment, the left end cover and the right end cover can be configured to have the same structure based on the specific cooperation relationship and functional requirements. In addition, every box body can be configured to have only one open end, so that only one end cover needs to be arranged.

In the schematic embodiment, the box body and the end cover cooperate with each other in the axial direction and are fixedly connected with each other by welding. For this purpose, the fixed connection area between the box body 10 and the left end cover 20 or the right end cover 20' is provided with a fitting structure, which extends along the axial direction of the box body and the end cover, including an inner fitting surface 11 arranged on the cavity surface of the box body and an outer fitting surface 21 arranged on the outer peripheral surface of the end cover. In addition, although not shown in the figure, other forms of fitting structures may be arranged between the box body and the end cover to provide additional fixed joint surfaces. For example, an additional axial fitting structure other than that shown in the figure can be arranged between the box body and the end cover. For another example, a flange can be arranged on the box body and end cover respectively, and a radial fitting structure is formed between the opposite end faces of the two flanges, and an additional fixed structure is formed through welding or bolt connection.

Figure 5:
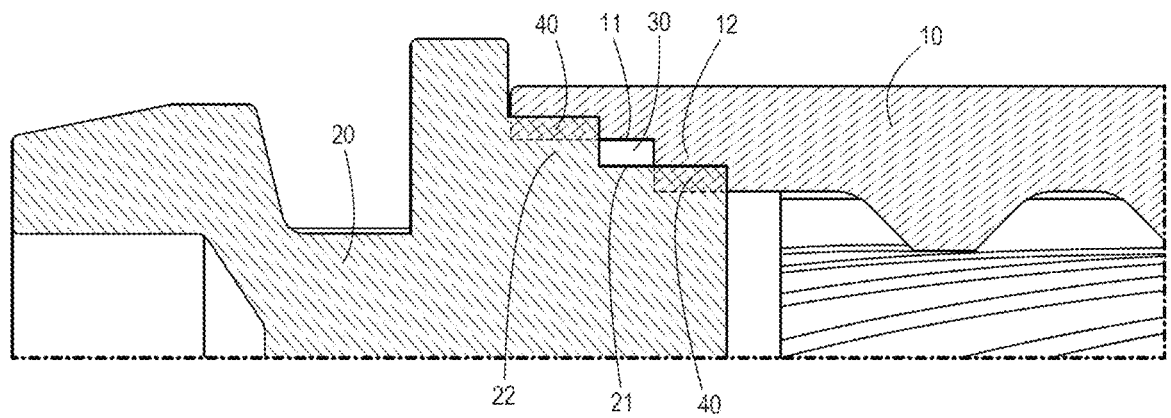
FIG. 5 is a partially enlarged view of the fitting structure between the box body and the end cover in FIG. 1.

FIG. 5 is a partially enlarged view of the fitting structure between the box body and the left end cover in FIG. 1. As shown in the figure, the fitting structure comprises a clearance fit area 30 configured between the inner fitting surface and the outer fitting surface and an interference fit area 40 located on both sides of the clearance fit area. Specifically, the inner fitting surface of the box body 10 is provided with a stepped inner rib 12. The inner rib extends one circle around the cavity surface of the box body and matches with the outer fitting surface of the end cover with an interference fit, thereby forming an interference fit area 40. In addition, the outer fitting surface of the end cover 20 is provided with a stepped outer rib 22, which extends around the entire periphery of the outer fitting surface of the end cover and interference-fits with the inner fitting surface of the box body to form another interference fit area 40. Besides, the portion on the outer fitting surface 21 of the end cover that is not provided with an outer rib forms an interference fit area 30 with the portion on the inner fitting surface 11 of the box body that is not provided with an inner rib.

During welding, the interference fit area 40 where the outer rib and the inner rib are located melts partially under high temperature, and flows into the clearance fit area 30 between the outer rib and the inner rib under pressure. It can be seen that in this solution, by setting a corresponding clearance fit area near the interference fit area, the product deformation caused by the extrusion of the molten body against the box body and end cover during the welding process can be effectively avoided. In contrast, in the solution of the prior art, the interference fit area will expand due to temperature rise and melting during the welding, resulting in large deformation of the fitting structure and even the entire box body and end cover, or even worse, waste products may be produced.

The fitting structure in FIGS. 1-5 may have many variations. For example, a larger number of ribs can be set, so that more dispersed welding areas can be formed in the fitting structure of the box body and the end cover, so as to further reduce the product deformation that may occur due to welding. For another example, the rib can be only provided on the outer fitting surface of the end cover or the inner fitting surface of the box body. It is particularly advantageous that the rib can be only provided on the outer fitting surface of the end cover. Compared with forming ribs on the inner fitting surface of the box body, arranging ribs on the outer fitting surface of the end cover is more convenient, and is easier to meet higher requirements of dimensional accuracy.

FIGS. 6-9 show the transmission gear box for a planetary gear mechanism according to another embodiment of the present invention. Similar to the embodiment in FIGS. 1-5, the transmission gear box comprises a box body 10 and an end cover 20. The box body is generally cylindrical, and its cavity is suitable for arranging a plurality of gears according to a predetermined structure. The two open ends of the box body are respectively fixed with an end cover, which is suitable for matching with a plurality of gears arranged in the box body to provide positioning and support for the gears. The inner surface of the box body is provided with a tooth groove, so that the box body can cooperate with the gears as a ring gear to form a planetary gear mechanism.

Similarly, the left end cover 20 and the right end cover 20' arranged respectively on the left and right open ends of the box body in the orientation shown in the figure are not the same, so that they can be matched with different gears and undertake different support functions. It can be understood that in an alternative solution of the current embodiment, the left end cover and the right end cover can be configured to have the same structure based on the specific cooperation relationship and functional requirements.

In addition, in the schematic embodiment, the box body 10 and the end cover 20 cooperate with each other in the axial direction and are fixedly connected with each other by welding. To this end, the box body and end cover together constitute a fitting structure, which extends along the axial direction of the box body and end cover. The fitting structure comprises an inner fitting surface arranged in the cavity of the box body and an outer fitting surface arranged on the peripheral surface of the end cover. In addition, although not shown in the figure, other forms of fitting structures may be arranged between the box body and the end cover to provide additional fixed joint surfaces. For example, an additional axial fitting structure other than that shown in the figure can be arranged between the box body and the end cover. For another example, a flange can be provided on the box body and the end cover respectively, a radial fitting structure can be formed between the opposite end faces of the two flanges, and an additional fixed structure can be formed through welding or bolt connection.

Different from the embodiment shown in FIGS. 1-5, the outer fitting surface 21 of the end cover in FIGS. 6-9 is provided with a plurality of outer ribs 22 extending along the axial direction, while the inner fitting surface 11 of the box body is a smooth surface. After the end cover is installed in place relative to the box body, the outer rib 22 and the inner fitting surface 11 form the interference fit area 40, while the portion between the two adjacent outer ribs and the inner fitting surface form the clearance fit area 30. During welding, the interference fit area 40 where the outer rib 22 is located melts locally at high temperature and flows into the adjacent clearance fit area 30 under pressure. Due to the arrangement of a clearance fit area, the expansion of the molten body and the pressure thereof generated by welding can be released, thus effectively avoiding the extrusion of the molten body against the box body and end cover to cause product deformation.

Figure 6:
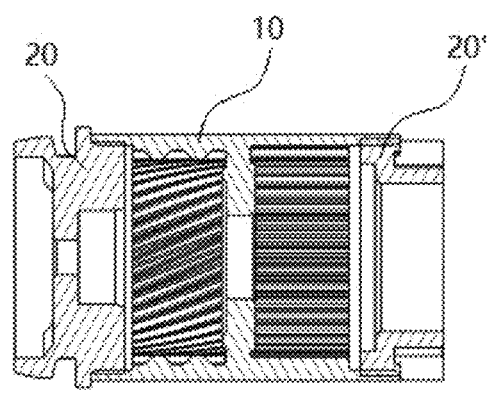
FIG. 6 is an axial section diagram of a transmission gear box with a planetary gear mechanism according to another embodiment of the present invention, in which the gears are also omitted to show the contents of the invention more clearly and concisely.
Figure 7:
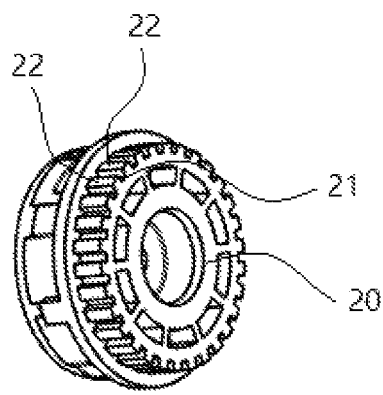
FIG. 7 is a schematic diagram of the left end cover in FIG. 6.
Figure 8:
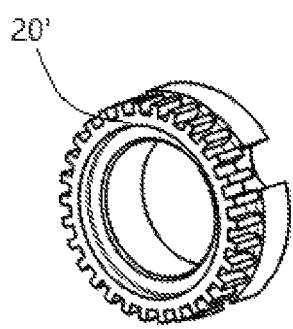
FIG. 8 is a schematic diagram of the right end cover in FIG. 6.
Figure 9:
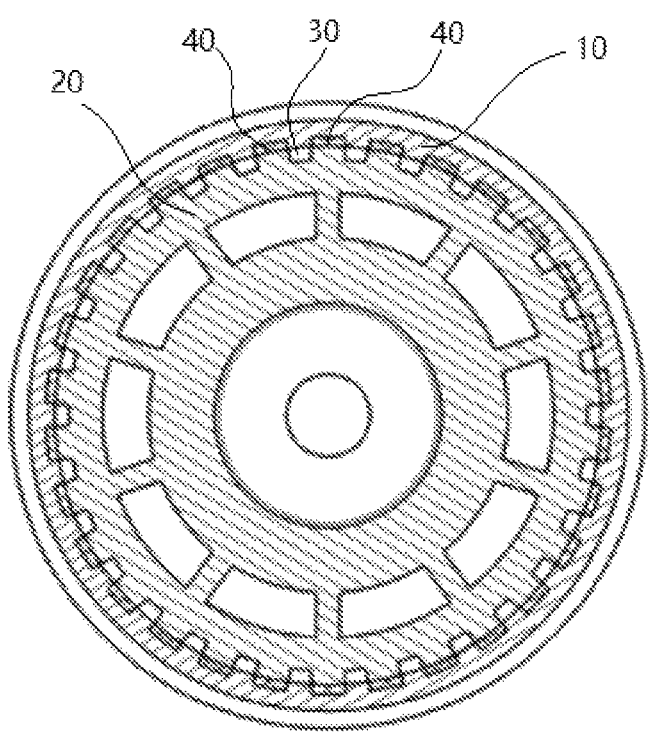
FIG. 9 is an enlarged cross-sectional view of the fitting structure between the box body and the end cover in FIG. 6.

The axial arrangement of the outer rib in the embodiment shown in FIG. 6 is particularly applicable to the case where the axial size of the fitting structure between the box body and the end cover is limited. Compared with the circumferentially arranged outer ribs or inner ribs, the axially arranged ribs are continuous in the axial direction, which facilitates maximum utilization of the limited axial space, creating a better fixing effect between the box cover and the end cover.

The above embodiments may have many variations. For example, a larger number of ribs may be set, so that more dispersed welding areas can be formed in the fitting structure of the box body and the end cover, thus further reducing the product deformation that may occur due to welding. For another example, the ribs may be arranged only on the outer fitting surface of the end cover or the inner fitting surface of the box body. It is particularly advantageous that the ribs may be arranged only on the outer fitting surface of the end cover. Compared with forming ribs on the inner fitting surface of the box body, arranging ribs on the outer fitting surface of the end cover is more convenient, and is easier to meet higher requirements of dimensional accuracy. In addition, as an alternative, the fitting structure may be configured to comprise an inner fitting surface arranged on the cavity surface of the end cover and an outer fitting surface arranged on the outer peripheral surface of the box body.

What is claimed is:

1. A transmission gear box comprising:
   a cylindrical box body, the box body having an axis therethrough and defining a cavity for gears;
   an end cover fixed on at least one axially opened end of the cavity of the box body; and
   a fitting structure extending at least in an axial direction of the box body and the end cover, the fitting structure including an inner fitting surface located on a surface of one of the box body and the end cover, and an outer fitting surface located on a surface of the other one of the box body and the end cover,
   wherein a clearance fit area having interference fit areas located on both sides thereof is arranged between the inner fitting surface and the outer fitting surface, the inner fitting surface including a stepped inner rib having three steps extending circumferentially and the outer fitting surface including a stepped outer rib having two steps extending circumferentially such that one interference fit area of the interference fit areas is at a different radial distance than the other interference fit area of the interference fit areas and a molten body produced by melting of an interference fit area occupies a portion of the clearance fit area.

2. The transmission gear box of claim 1, wherein a portion between two separated steps of the three steps of the stepped inner rib and the opposite outer fitting surface form the clearance fit area.

3. The transmission gear box of claim 2, wherein each step of the stepped inner rib is parallel to each other step of the stepped inner rib.

4. The transmission gear box of claim 1, wherein the inner fitting surface is arranged on an axial inner peripheral surface of the cavity of the box body and the outer fitting surface is arranged on an axial outer peripheral surface of the end cover.

5. The transmission gear box of claim 1, wherein the at least one axially opened end of the cavity is a first open end, and wherein the box body includes a second open end, the first and second open ends opened in opposite directions from the cavity in the axial direction, and the at least one end cover comprises a first end cover and a second end cover, which are respectively fixed to the first open end and the second open end.

6. The transmission gear box of claim 5, wherein identical fitting structures are located between the first end cover and the box body and between the second end cover and the box body.

7. The transmission gear box of claim 1, wherein a surface of the cavity of the box body includes a tooth groove, and wherein the box body and at least one of the gears contained in the cavity thereof together form a planetary gear mechanism.

* * * * *